United States Patent [19]
Ando

[11] Patent Number: 5,682,252
[45] Date of Patent: Oct. 28, 1997

[54] IMAGE READING DEVICE WITH COVER STATUS DETECTOR

[75] Inventor: Motonobu Ando, Iwakura, Japan

[73] Assignee: Brother Kogyo Kabushiki Kaisha, Aichi-ken, Japan

[21] Appl. No.: 656,098

[22] Filed: May 31, 1996

[30] Foreign Application Priority Data

Jun. 1, 1995 [JP] Japan .................. 7-135110

[51] Int. Cl.⁶ .................. H04N 1/40; H04N 1/04; H04N 1/38
[52] U.S. Cl. .................. 358/461; 358/474; 358/464
[58] Field of Search .................. 358/498, 474, 358/494, 461, 464

[56] References Cited

U.S. PATENT DOCUMENTS

| | | | |
|---|---|---|---|
| 4,751,258 | 6/1988 | Koseki et al. | 358/256 |
| 4,882,631 | 11/1989 | Mine et al. | 358/471 |
| 5,107,350 | 4/1992 | Omori | 358/461 |
| 5,125,047 | 6/1992 | Ito et al. | 382/321 |

*Primary Examiner*—Kim Vu
*Assistant Examiner*—Tia M. Harris
*Attorney, Agent, or Firm*—Kane, Dalsimer, Sullivan, Kurucz, Levy, Eisele and Richard, LLP

[57] ABSTRACT

A reference surface for determining a threshold level of an image sensor is provided on a guide plate swingable with a cover away from the image sensor. The reference surface has markings thereon for determining a reading range of the image sensor. The image reading device makes three detections from the reading of the reference surface: a detection of the cover position by detecting the presence of the markings; a detection of the reading range of the image sensor by detecting the arrangement of the markings; and a detection of the threshold level of the image sensor by detecting the background of the reference surface. The threshold level is not taken until the device has determined that the cover is closed.

20 Claims, 5 Drawing Sheets

IMAGE READING DEVICE WITH COVER STATUS DETECTOR

BACKGROUND OF THE INVENTION

The present invention relates to an image reading device used in a facsimile device, copier, or the like.

Conventionally, a facsimile device includes an image reading device for reading an image printed on an original. An "original" is an original document, drawing, or other sheet bearing an image to be read. The image is transmitted to another facsimile device via a modem, a network control unit (NCU), and a telephone line.

A feeding device in the image reading device feeds an original, a light source illuminates the original, and an image sensor (such as a CCD) reads the reflected light.

In order to provide a threshold for discriminating an image pattern from the background (usually white), the image reading device often includes a white level reference member facing the image sensor across the feed path of the originals. The white level reference member is readable when no original is present in the feed path.

After the facsimile device is turned on, the image sensor reads the white surface of the white level reference member and the threshold (white level) is stored.

In many facsimile devices and copiers, a movable cover is provided for covering the image reading device, and the cover can be opened for removing jammed paper.

However, when the cover is not fully closed, external or ambient light may enter the interior of the facsimile device. If the external light reaches the image sensor while the image sensor is reading the white level reference member, the threshold setting may become faulty. To avoid this situation, the image reading device may incorporate a sensor (such as a limit switch) for detecting when the movable cover is fully closed. The use of such a sensor increases the cost of the device.

Alternatively, the threshold can be determined at the factory and stored in an EEPROM-type memory (or other non-volatile memory). However, since the threshold data can be several hundred bytes, a relatively large EEPROM is necessary to store the threshold data, also increasing the cost. The same problem exists in a copier, an image scanner or a digitizer.

SUMMARY OF THE INVENTION

In order to meet this object, according to one aspect of the present invention, an image reading device includes: an image sensor for reading images from an original; a white level reference member, facing the image sensor and readable by the image sensor to set a white level threshold of the image sensor; and at least one marking formed on the white level reference member; a movable cover associated with the white level reference member; and control means for checking if the image sensor reads the at least one marking to determine a status of the movable cover based on the checking.

In this manner, no special sensor is required to sense the status of the movable cover, as the marking is used to determine the status.

Preferably, the control means includes means for initiating the checking in response to power being supplied to the controller. In this case, the checking is performed every time the facsimile device or other device housing the image reading device is turned on.

In one particular development of this aspect of the invention, the image reading device further includes: a memory for storing the white level threshold, the control means storing the white level threshold in the memory only after the image sensor detects the marking.

The white level reference member is preferably mounted to the movable cover, so that the markings are not sensed when the cover is moved away from the image sensor.

The device may include display means, and wherein the controller controls the display means to indicate the status of the movable cover.

According to another aspect of the present invention, an image reading device, includes: an image sensor for reading images from an original; a white level reference member, facing the image sensor and readable by the image sensor to set a white level threshold of the image sensor; and at least one marking defining a reading range of the image sensor, the at least one marking being formed on the white level reference member facing the image sensor; a movable cover associated with the white level reference member; and control means for checking if the image sensor reads the at least one marking to determine a status of the movable cover based on the checking.

In this manner, no special sensor is required to sense the status of the movable cover, as the marking provided for the purpose of determining a reading range of the image sensor is used to determine the status.

In one particular development, the marking or markings are a pair of parallel markings spaced by a predetermined distance on the reference surface. These marking lines are used to define the center position and width of the reading range.

In another particular development, the movable cover is swingably supported to open and close. The white level reference member is swung away from the image sensor to a first position where the white level reference member is unreadable by the image sensor when the movable cover is in an open status, and to a second position where the white level reference member is readable by the image sensor when the movable cover is in a closed status.

In this case, the control means preferably controls the image sensor to set the white level threshold only when the control means verifies a status of the movable cover to be a closed status where the white level reference member is readable by the image sensor.

In still another aspect of the invention, an image reading device includes: a lower guide plate having an opening formed therein; an upper member, swingable toward and away from the lower guide plate; a line image sensor attached to the lower guide plate, the line image sensor positioned to read images through the opening; a white level reference member attached to the upper member in a position readable by the line image sensor only when the white level reference member is swung toward the lower guide plate, the white level reference member defining a white level threshold of the image sensor when the image sensor reads the white level reference member; a pair of markings on the white level reference member in a position readable by the line image sensor only when the white level reference member is swung toward the lower guide plate, the pair of markings being separated from each other by a predetermined distance; and a controller includes: means for checking a position of the upper member based on a reading of the pair of markings by the line image sensor, means for setting a reading range of the line image sensor based on a reading of the predetermined distance from the pair of markings by the line image sensor; and means for setting a white level threshold of the image sensor based on a reading of the white level reference member by the line image sensor.

In this manner, the controller carries out three functions based upon the reading of the reference surface: setting of reading range, setting of white level threshold, and checking the upper member position. Since the upper member is preferably provided to a swingable cover, the controller determines the position of the swingable cover depending on the means for checking a position of the upper member.

DETAILED DESCRIPTION OF THE PREFERRED EMBODIMENTS

Figure 1:
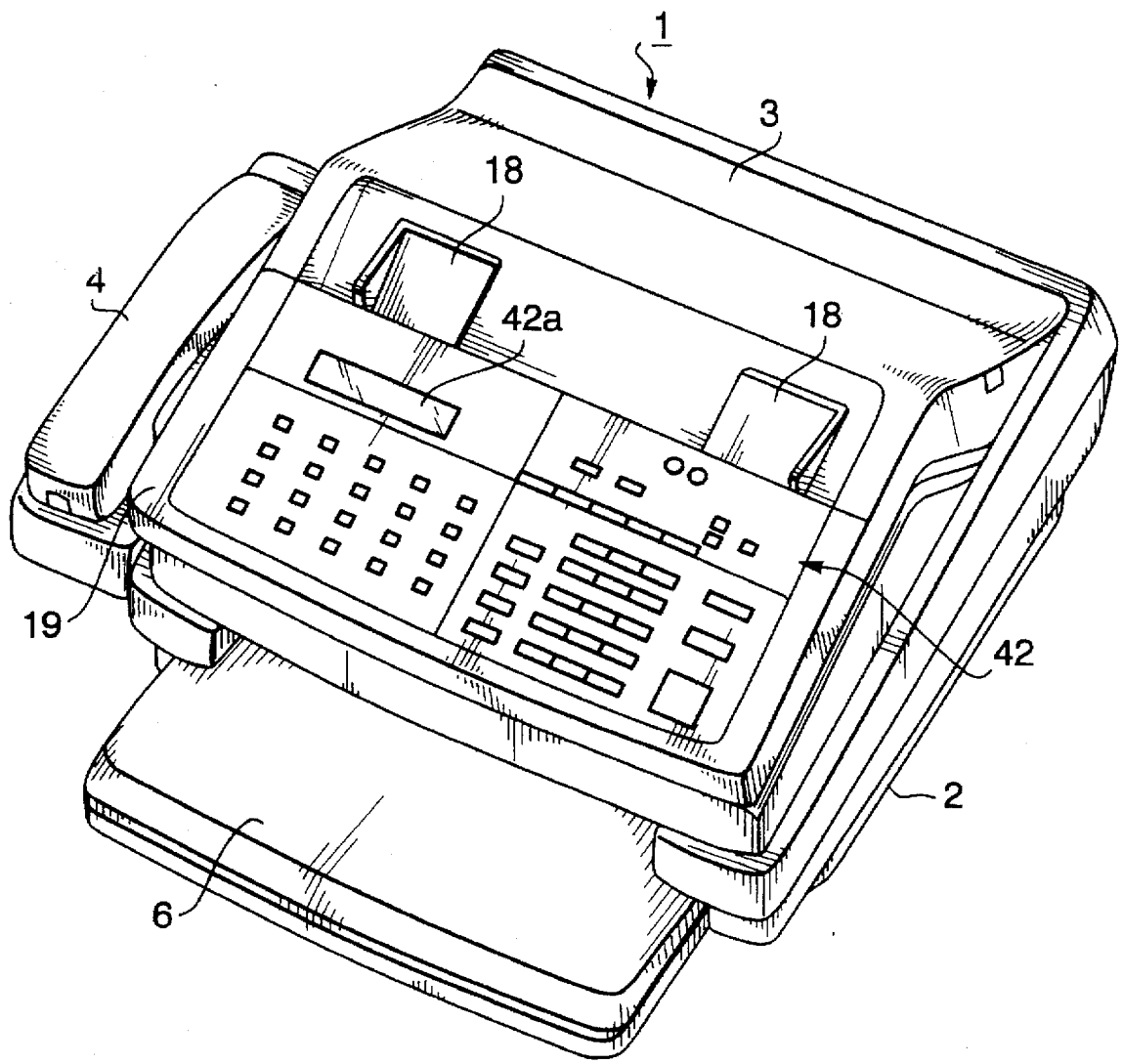
FIG. 1 is a perspective view of a facsimile device employing an embodiment of an image reading device according to the invention.
Figure 2:
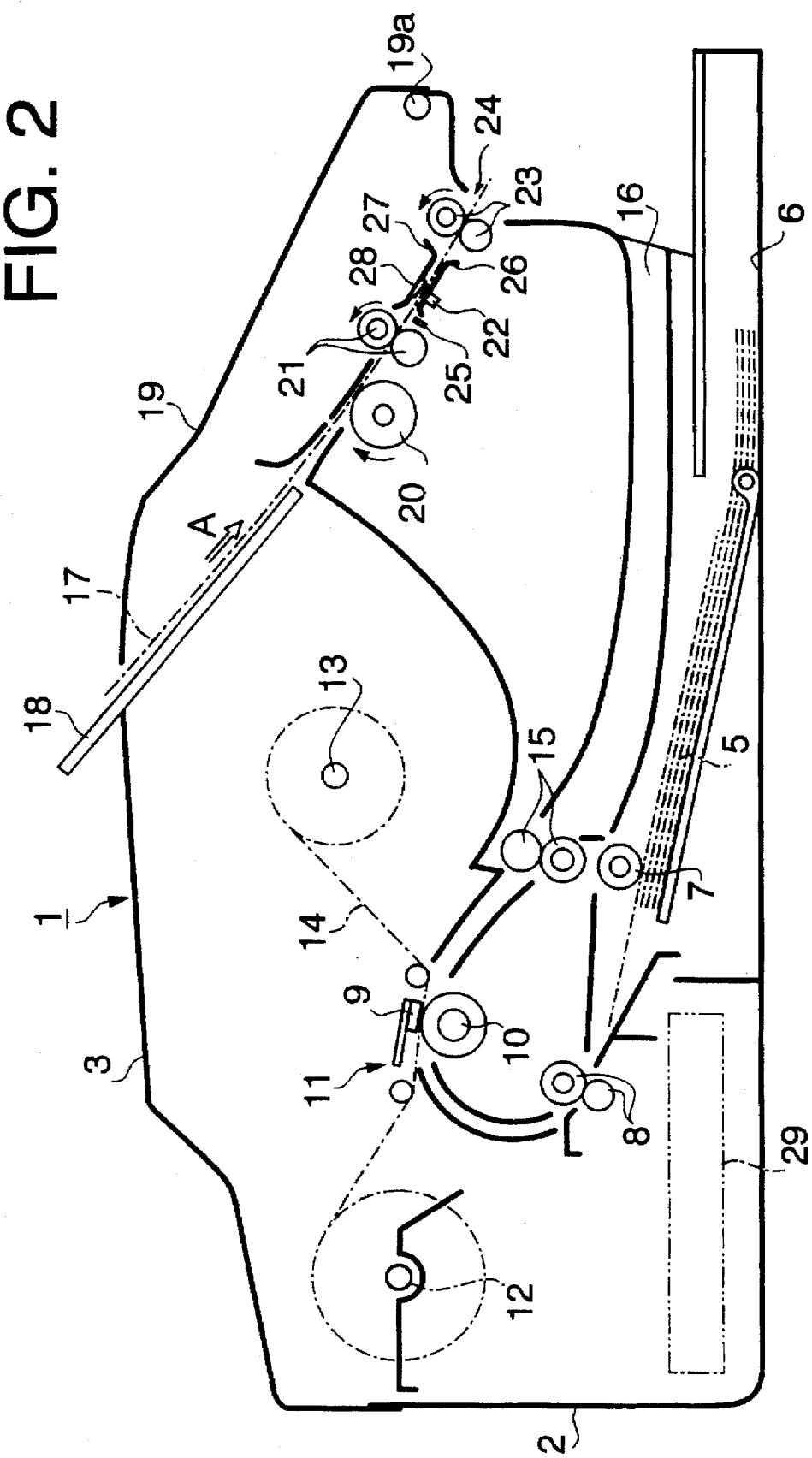
FIG. 2 is a schematic side view of the facsimile of FIG. 1.

FIG. 1 is a perspective view of a facsimile device 1 to which the embodiment of the invention is applied, and FIG. 2 is a schematic side view of the facsimile device 1. As shown in FIG. 1, the body of the facsimile device includes a lower cover 2 and an upper cover 3. A handset 4 is provided at one side of the lower cover 2. A recording sheet cassette 6 is attachable to and detachable from the lower case 2. An original holder 18 accepts originals to be read. A movable cover 19, having an operation panel 42 with a display 42a, is rotatably supported on the upper cover 3.

As shown in FIG. 2, a number of recording sheets 5 are stacked in the recording sheet cassette 6. A single recording sheet 5 is fed by a sheet feeding roller 7 from the stack to a pair of intermediate feeding rollers 8, which feed the sheet 5 to a printing unit 11 including a thermal line printing head 9 and a platen roller 10.

When the recording sheet 5 reaches the printing unit 11, the intermediate feeding rollers 8 wait until the facsimile device 1 receives image data from another facsimile device, and then feed the recording sheet 5 in tandem with the platen roller 10. When the facsimile device 1 receives the image data, the image is reproduced on the waiting recording paper 5 via an ink sheet 14 (fed from a feeding reel 12 and wound by a winding reel 13). The recording sheet 5 on which the image is formed is discharged through a recording sheet discharge slot 16 by a pair of discharge rollers 15.

One or more originals 17 are placed on the original holder 18, inclined downward to the front side of the facsimile device 1. The movable cover 19 is swingably supported about a shaft 19a provided to the front side of the upper cover 3. The original 17 placed on the original holder 18 is fed by a separating roller 20 (if more than one original, it is separated from the remaining originals) and a pair of feeding rollers 21 through an original reading portion and discharged through an original discharge slot 24. The original reading portion is shown in detail in FIGS. 3 and 4.

Figure 3:
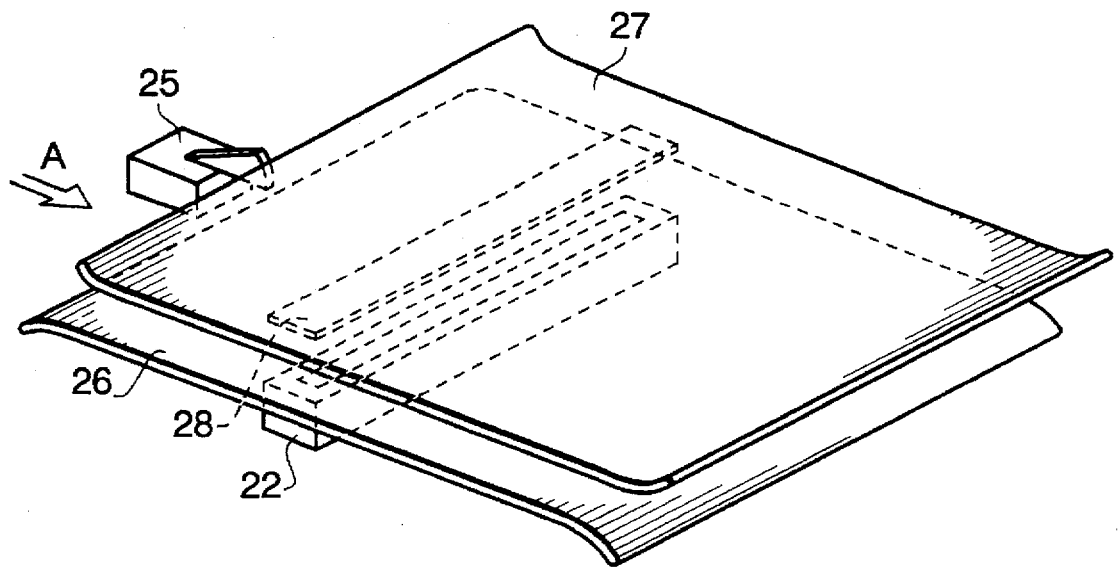
FIG. 3 is a perspective view of an original reading portion of the facsimile device of FIG. 1.

As shown in FIG. 3, the original 17 is fed between an upper guide plate 27 and a lower guide plate 26 in the original reading portion to a CCD scanner 22. The CCD scanner 22 is provided to the lower guide plate 26. The lower guide plate 26 has an opening (elongated in the direction of original width) through which a detecting surface of the CCD scanner 22 can face the upper guide plate 27.

The original reading portion includes an original detecting switch 25 provided upstream of the CCD scanner 22 for reading an image. The original detecting sensor 25 can be a contact type sensor, such as a micro limit switch, or a non-contact type sensor, such as a photosensor. The original detecting sensor 25 is provided upstream of the CCD scanner 22 by a distance $L_1$.

Figure 4:
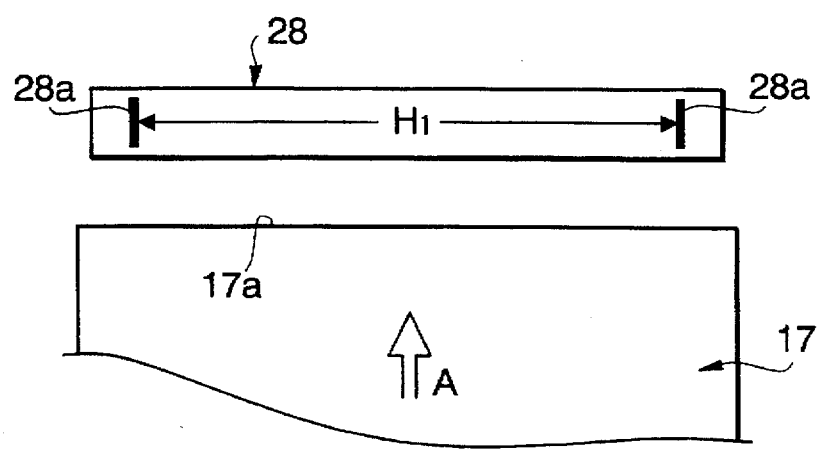
FIG. 4 is a schematic bottom view of a white level reference member of the original reading portion of FIG. 3.

A white level reference member 28 having the same length as the detecting surface of the CCD scanner 22 is attached to the upper guide plate 27. As shown in FIG. 4, a pair of black lines 28a, 28a are formed having an interval H1 in the width direction of the original 17 (i.e., the scanning direction of the CCD 22). The interval H1 is provided for setting the reading range of the original in the direction of the original width. That is, a CPU 30 (described later) sets the center position of the reading range according to the center position of the black lines 28a—28a as readby the CCD 22.

Figure 5:
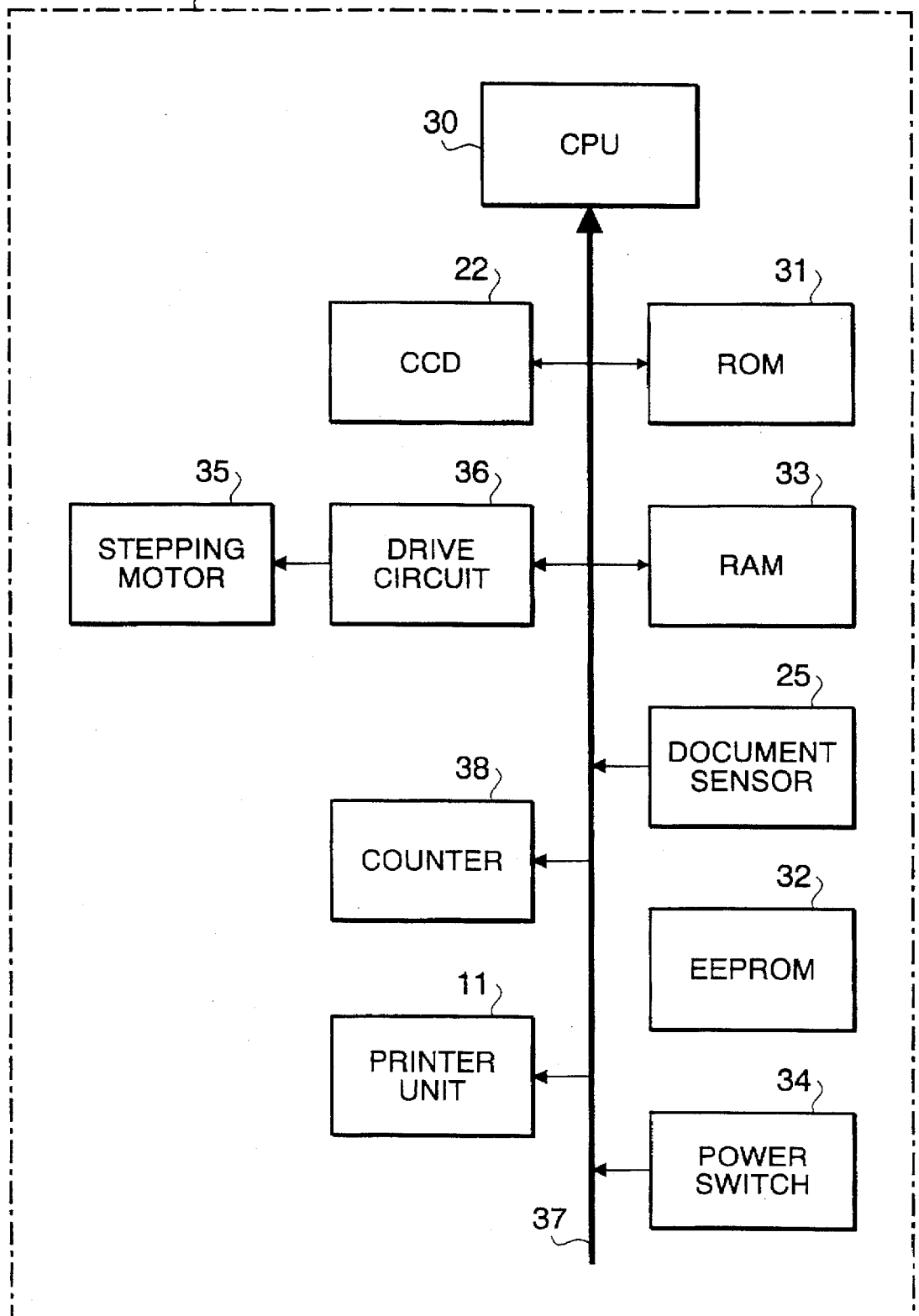
FIG. 5 is a block diagram of a control system of the image reading device.

FIG. 5 is a block diagram showing a control system 29 of the facsimile device. A CPU 30 is connected (via a bus 37) to a power switch 34, a ROM 31 storing a control program, a readable and writable non-volatile memory (EEPROM) 32, a RAM 33, the CCD scanner 22, the original detecting sensor 25, the printing unit 11, and driving circuit 36 for driving a stepping motor 35 which drives the feeding rollers 21.

The EEPROM 32 has a quick-dial number storing area, an originator's number storing area, a communication condition storing area, and a function storing area (including communication mode, program and function data). The RAM 33 has a communication managing information storing area for storing communication information such as the date and time of a communication.

The CPU 30 is also connected by the bus 37 (via unillustrated connections) to the operation panel 42 for entering data such a facsimile number, the LCD display 42a of the operation panel 42, and the handset 4. The CPU is further connected to unillustrated elements well known in the art: a network control unit (NCU) for controlling a network via an external telephone exchange, a modem, a buffer memory for temporarily storing the coded image data, a coding circuit for coding the image data to be transmitted, a decoding circuit for decoding the image data received, and an image memory for storing the received data a clock circuit for a calendar function such as date and time, and a character generating portion for displaying characters on the LCD display 42a and for generating characters according to the character code for printing by the printing unit 11.

Figure 6:
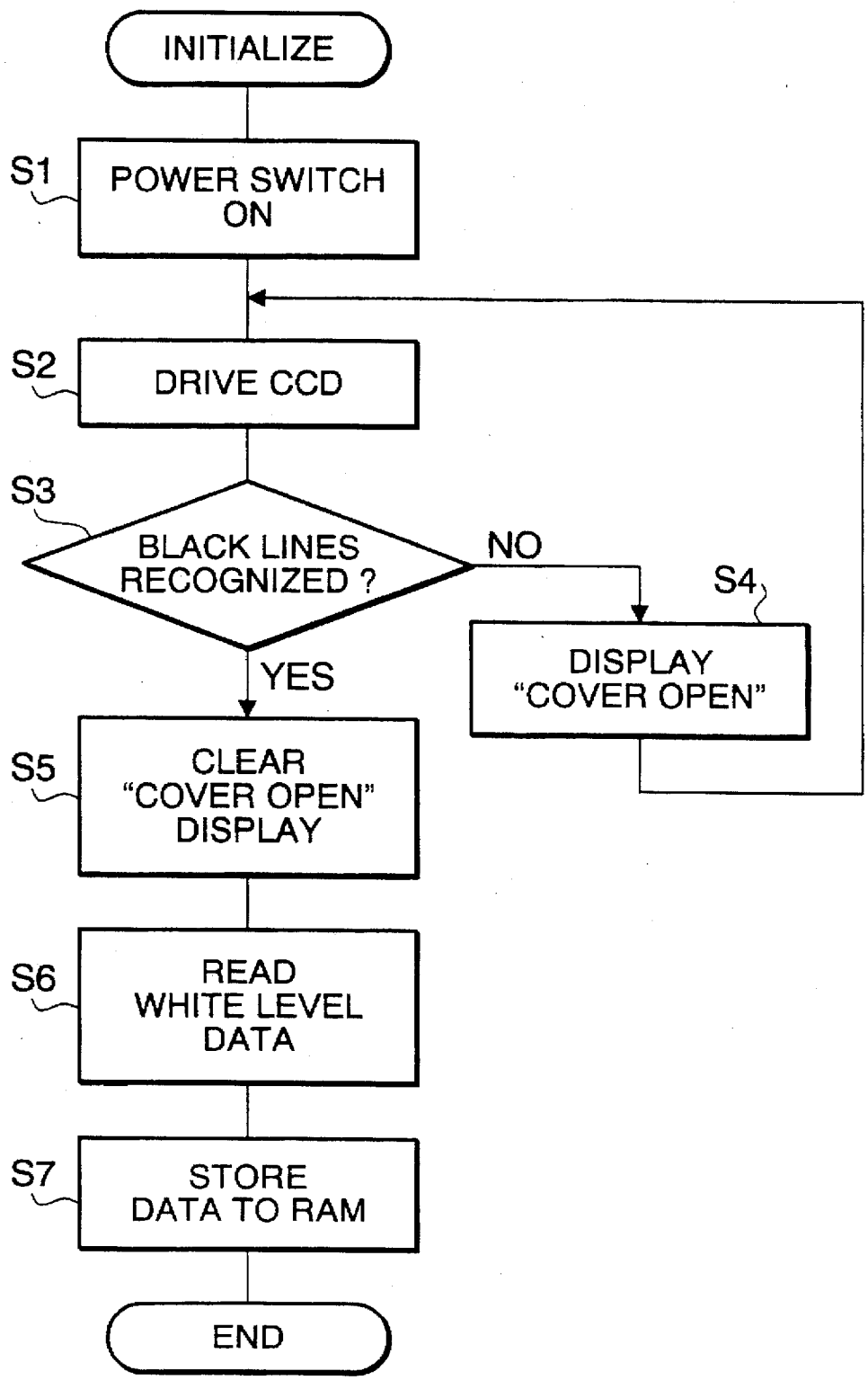
FIG. 6 is a flow chart showing an initializing operation of the image reading device.

An initializing operation of the facsimile device 1 is shown in the flowchart of FIG. 6. As shown in FIG. 6, when the power switch 34 is turned ON (step S1), the CCD scanner 22 is driven and begins scanning in step S2. In step S3, the CPU 30 evaluates the result of the CCD scan, and checks if the black lines 28a, 28a on the white level reference member 28 can be recognized in the line image data at step S3. If the CPU 30 does not recognize the black lines 28a, 28a in the line image data (N at step S3), the CPU 30 illuminates an LED lamp (not shown) provided on the operation panel 42, displays "COVER OPEN" in the LCD display 42a, then returns to step S2. That is, the CPU 30 recognizes that the cover is open if the black lines 28a, 28a, are not detected.

If the CPU 30 recognizes the black lines 28a, 28a in the line image data (Y at step S3), it proceeds to step S5. In step S5, "COVER OPEN" in the display is erased. Naturally, if "COVER OPEN" was never displayed, step S5 has no effect. The CPU 30 will only proceed to step S5 if the cover 19 is sufficiently, i.e., completely, closed. The process then proceeds to step S6.

In step S6, the CPU 30 reads the white reference surface, and continues to step S7, where the threshold data from reading the white level reference member 28 is stored in the RAM 33. In this manner, when the facsimile device 1 is turned on, the CPU 20 uses the image signal from the CCD 22 to detect whether or not the cover 19 is fully closed. Consequently, the facsimile device 1 does not need an independent sensor for detecting whether the cover 19 is fully closed or not. Furthermore, the threshold is renewed every time the facsimile device is turned on, and a large EEPROM or other non-volatile memory for storing threshold data is not needed.

Furthermore, by fixing the upper guide plate 27 to the cover 19, the gap between the guide plates 26 and 27 becomes larger when the cover 19 is opened. Therefore, the operation for removing the original may become easier. Still further, by providing the white level reference member 28 to the surface of the upper guide plate 27, the operation for cleaning or replacement of the white level reference member 28 may be easier.

The present disclosure relates to subject matter contained in Japanese Patent Application No. HEI 07-135110, filed on Jun. 1, 1995, which is expressly incorporated hereinby reference in its entirety.

What is claimed is:

1. An image reading device, comprising:
   an image sensor for reading images from an original;
   a white level reference member, facing said image sensor and readable by said image sensor to set a white level threshold of said image sensor;
   at least one marking formed on said white level reference member;
   a movable cover associated with said white level reference member; and
   control means responsive to said image sensor for checking if said image sensor reads said at least one marking to determine a status of said movable cover based on said checking.

2. The image reading device according to claim 1, wherein said control means comprises means for initiating said checking in response to power being supplied to said controller.

3. The image reading device according to claim 1, further comprising:
   a memory for storing said white level threshold, said control means storing said white level threshold in said memory only after said image sensor detects said marking.

4. The image reading device according to claim 1, wherein said white level reference member is mounted to said movable cover.

5. The image reading device according to claim 1, further comprising display means, and wherein said controller controls said display means to indicate said status of said movable cover.

6. An image reading device, comprising:
   an image sensor for reading images from an original;
   a white level reference member, facing said image sensor and readable by said image sensor to set a white level threshold of said image sensor; and
   at least one marking defining a reading range of said image sensor, said at least one marking being formed on said white level reference member facing said image sensor;
   a movable cover associated with said white level reference member; and
   control means for checking if said image sensor reads said at least one marking to determine a status of said movable cover based on said checking.

7. The image reading device according to claim 6, wherein said control means comprises means for initiating said checking in response to power being supplied to said controller.

8. The image reading device according to claim 6, wherein said at least one marking is a pair of parallel markings spaced by a predetermined distance on said reference surface.

9. The image reading device according to claim 6, further comprising:
   a memory for storing said white level threshold, said control means storing said white level threshold in said memory when said image sensor detects said marking.

10. The image reading device according to claim 6, wherein said white level reference member is mounted to said movable cover.

11. The image reading device according to claim 10, wherein said movable cover is swingably supported to open and close, and said white level reference member is swung away from said image sensor to a first position where said white level reference member is unreadable by said image sensor when said movable cover is in an open status, and said white level reference member is swung toward said image sensor to a second position where said white level reference member is readable by said image sensor when said movable cover is in a closed status.

12. The image reading device according to claim 11, wherein said control means controls said image sensor to set said white level threshold only when said control beans verifies a status of said movable cover to be a closed status where said white level reference member is readable by said image sensor.

13. The image reading device according to claim 6, further comprising display means, and wherein said controller controls said display means to indicate said status of said movable cover.

14. An image reading device, comprising:
   a lower guide plate having an opening formed therein;
   an upper member, swingable toward and away from said lower guide plate;
   a line image sensor attached to said lower guide plate, said line image sensor positioned to read images through said opening;
   a white level reference member attached to said upper member in a position readable by said line image sensor only when said white level reference member is swung toward said lower guide plate, said white level reference member defining a white level threshold of said image sensor when said image sensor reads said white level reference member;
   a pair of markings on said white level reference member in a position readable by said line image sensor only when said white level reference member is swung toward said lower guide plate, said pair of markings being separated from each other by a predetermined distance; and a controller including:

means for checking a position of said upper member based on a reading of said pair of markings by said line image sensor;

means for setting a reading range of said line image sensor based on a reading of said predetermined distance from said pair of markings by said line image sensor; and means for setting a white level threshold of said image sensor based on a reading of said white level reference member by said line image sensor.

15. The image reading device according to claim 14, wherein said upper member is provided to a swingable cover, and said controller checks a position of said swingable cover depending on said means for checking a position of said upper member.

16. The image reading device according to claim 14, wherein said means for setting a white level threshold of said image sensor is only operated after said controller verifies that said upper member is swung toward said image sensor by said means for checking a position of said upper member.

17. The image reading device according to claim 1 wherein said movable cover status to be determined is whether said movable cover is open or closed.

18. The image reading device according to claim 17 wherein said movable cover is determined to be open when said image sensor reads said at least one marking and said cover is determined to be closed when said image sensor cannot read said at least one marking.

19. The image reading device according to claim 6 wherein said movable cover status to be determined is whether said movable cover is open or closed.

20. The image reading device according to claim 19 wherein said movable cover is determined to be open when said image sensor reads said at least one marking and said cover is determined to be closed when said image sensor cannot read said at least one marking.

* * * * *